United States Patent [19]
Moore, Jr.

[11] Patent Number: 5,127,093
[45] Date of Patent: Jun. 30, 1992

[54] COMPUTER LOOK-AHEAD INSTRUCTION ISSUE CONTROL

[75] Inventor: William T. Moore, Jr., Elk Mound, Wis.

[73] Assignee: Cray Research Inc., Minneapolis, Minn.

[21] Appl. No.: 297,967

[22] Filed: Jan. 17, 1989

[51] Int. Cl.$^5$ ................................................ G06F 9/38
[52] U.S. Cl. .................................. 395/375; 364/263.1; 364/281.6; 364/948
[58] Field of Search ................................. 364/200, 900

[56] References Cited
U.S. PATENT DOCUMENTS

| | | | |
|---|---|---|---|
| 3,614,745 | 10/1971 | Podvin et al. | 364/200 |
| 3,771,138 | 11/1973 | Celtruda et al. | 364/200 |
| 4,128,880 | 12/1978 | Cray | 364/200 |

OTHER PUBLICATIONS

"The Cray-2 Engineering Maintenance Manual, CMM 0200000", Dec. 1987, pp. 4—1 through 4—3.
IBM Journal of Research and Development, vol. 11, No. 1, Jan. 1967; D. W. Anderson et al.: "The IBM System/360 Model 91: Machine Philosophy and Instruction-handling".
IBM Technical Disclosure Bulletin, vol. 27, No. 5, Oct. 1985, Capozzi, et al.: "Non-sequential High-performance Processing".
IEEE Transactions on Computers, C-33 No. 11, Nov. 1984, IEEE, Weiss et al; "Instruction Issue Logic in Pipelined Supercomputers".

*Primary Examiner*—David Y. Eng

[57] ABSTRACT

A system for scheduling instruction issuance in a vector register computer achieves increased efficiency of operation by performing pre-issuance checks to determine if resources requested by the instruction will be available when the instruction issues. A decoding apparatus first determines particular resources requested by the instruction, which includes apparatus for decoding vector register requests, functional unit requests, and address and scalar register path requests. Following decoding, a conflict resolution apparatus checks resource reservation flags to determine if the requested resources will be available when the instruction issues. If any requested resources will be busy, the system issues a primary conflict signal. At the scheduled instruction issuance time, the system again checks the resource reservation flags in response to the primary conflict signal. If the requested resources are still busy, the system generates a secondary conflict signal for as long as the requested resources remain busy. Finally, when the instruction issues, the system sets the resource reservation flags to reserve the requested resources for the instruction.

6 Claims, 6 Drawing Sheets

COMPUTER LOOK-AHEAD INSTRUCTION ISSUE CONTROL

FIELD OF THE INVENTION

This invention relates generally to control logic for computer systems. In particular, it is directed to look-ahead control logic for instruction issue.

BACKGROUND OF THE INVENTION

To maximize computer performance, systems designers have long sought techniques that minimize the time required for instruction execution. Performance gains are promoted by hardware architectures that include a plurality of functional units, vector registers, scalar registers, address registers, and instruction buffers. In order to justify the cost of these expensive components, they must be kept reasonably busy. Parallel instruction execution represents an effort to increase the utilization of resources within a single processor.

In some computers, the instruction issue process involves checking the reservation flags for the resources involved in the operation during the clock period when the instruction is scheduled to issue. The instruction waits in the issue position until all of the required resources are available. Immediately upon instruction issue the reservation or busy flags are set for the assigned resources by the instruction issue control. Thereafter, subsequent instructions test these reservation flags immediately prior to issue and hold at the issue position if a resource conflict occurs.

In most computers, instruction issue occurs at every clock period if there is no resource conflict. Typically, the clock speed is slow enough that all necessary conflict checks, followed by instruction issue, can occur within one clock period. As clock speeds increase, however, there is not enough time in one clock period to resolve all the conflicts and then issue the instruction.

One such computer is the Cray 2 supercomputer built by Cray Research, Inc., the Assignee of the present invention. Because of propagation and fan-out delays caused by a four nanosecond system clock, the Cray 2 requires two clock periods to complete the "test and issue" sequence of testing for resource conflicts and then issuing the instruction. Therefore, the maximum instruction issue rate of the Cray 2 is one instruction every two clock periods.

SUMMARY OF THE INVENTION

To overcome the limitations in the prior art discussed above and to overcome other limitations readily recognizable to those skilled in the art, the present invention provides a new architecture for instruction issue control.

According to one object of the present invention, the look-ahead instruction issue control tests for resource conflicts before the instruction issues. Rather than check for resource conflicts only at instruction issue time, the present invention performs this operation for a plurality of pre-issue instructions.

Yet another object of the present invention is to check for resource conflicts between each of the preissue instructions and resources currently in use and for conflicts with resources to be used by instructions ahead of it in the instruction issue process.

DESCRIPTION OF THE DRAWINGS

In the drawings, where like numerals refer to like elements throughout the several views.

DETAILED DESCRIPTION OF THE PREFERRED EMBODIMENT

Figure 1:
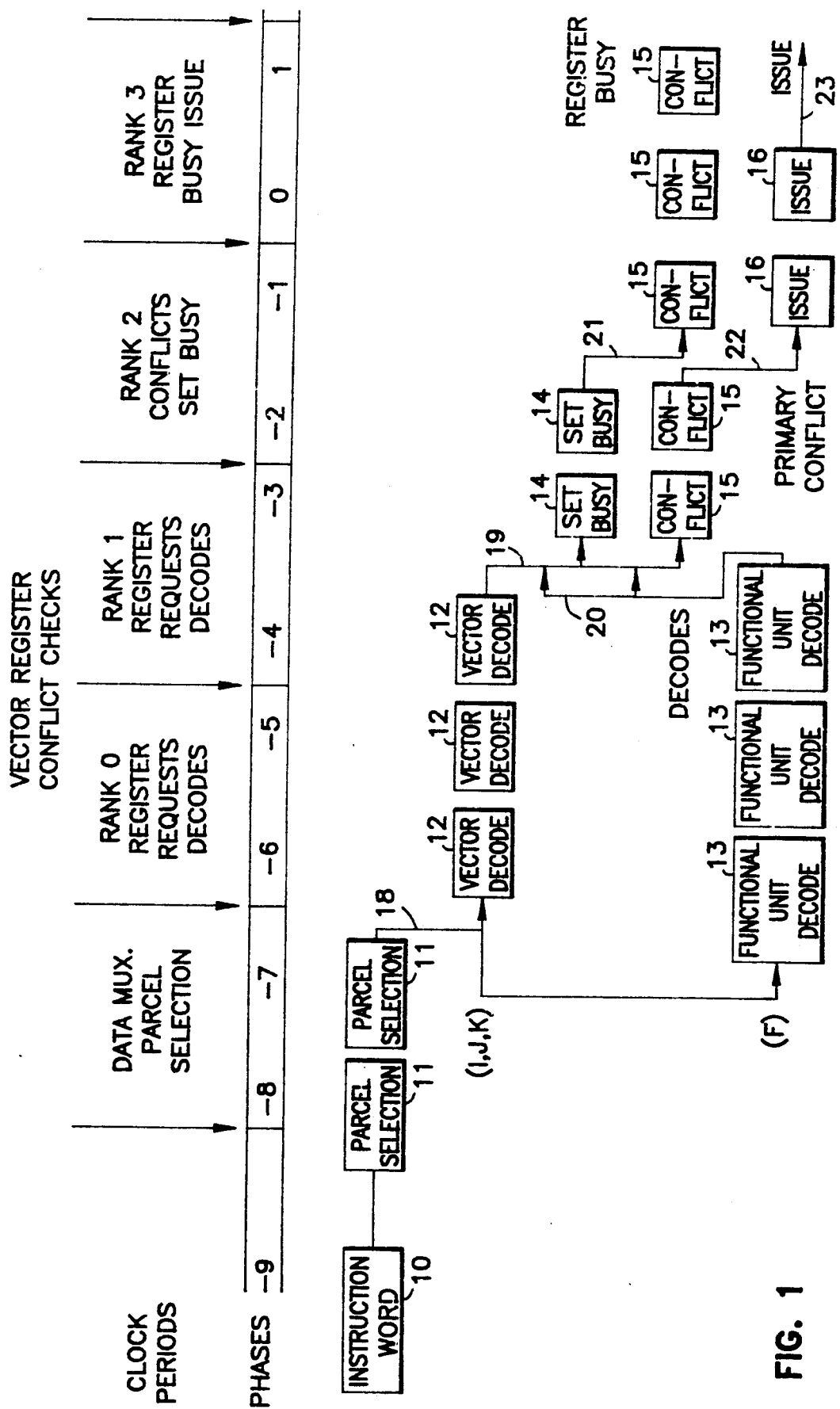
FIG. 1 is a combination hardware-and-timing diagram of the register busy conflict checks, as executed in the preferred embodiment.

In the following detailed description of the preferred embodiment, reference is made to the accompanying drawings which form a part hereof, and in which is shown by way of illustration a specific embodiment in which the invention may be practiced. The embodiment is described in terms of block diagrams and timing diagrams, upon which detailed logic designs (not shown) could be based as is generally known in the art. It is to be understood that other embodiments may be utilized and that structural changes may be made without departing from the scope of the present invention.

The present invention permits instruction issue at every clock period, regardless of the speed of the clock, by resolving resource conflicts before instruction issue.

On the timing diagrams of FIGS. 1,2,3,4, and 5, gradations along the horizontal axes represent clock periods, where each period is divided into two clock phases. The vertical downward pointing arrows represent the clock period intervals. The clock period intervals when conflict checks and resource reservations are performed are labelled as "Ranks" in the drawings. The numbers ranging from −9 through +1 represent clock phases. The computer embodying the present invention is comprised of logic that can trigger on the leading or trailing edge of the clock pulse. Therefore each clock period is comprised of two phases, one phase identifying the leading edge of the clock pulse and the other phase identifying the trailing edge of the clock pulse.

Referring initially to FIG. 1, the diagram describes the vector register conflict checks. Beginning at phase −9, the instruction word is present in register 10. In this preferred embodiment, an instruction word is 64 bits, but an individual instruction parcel consists of only 16 bits. The correct 16 bit instruction parcel is selected from within the 64 bit instruction word.

Circuit 11 is the instruction parcel selection circuit. At phases −8 and −7, the desired instruction parcel 18 is selected. The instruction parcel 18 selected is the one scheduled for execution at phase 0. The instruction parcel is transmitted to the decoding circuits 12 and 13.

From phase −6 through phase −4, the instruction parcel is decoded. The diagram shows a divergence into two paths at phase −6. Circuit 12 decodes the vector register request. Circuit 13 decodes the functional unit request. At phase −4, the vector registers and functional unit are known and that information is transferred to circuits 14 and 15 via signals 19 and 20.

At phase −3 through phase −2, resource conflicts are resolved and "busy enable" signals are generated to set the reservation flags. The diagram shows a divergence into two paths at phase −3. The upper path, representing circuit 14, generates the "busy enable" signals 21 that circuit 15 uses to set the reservation flags for the requested resources. The lower path, representing circuit 15, checks the reservation flags for resource conflicts with previous instructions, generates a Primary Conflict signal 22 if required, and sets the reservation flags upon instruction issue. The reservation flags for vector registers and functional units each consist of a single latch. If the output of the latch is a logical "1", then the associated resource is busy. If the output of the latch is a logical "0", then the associated resource is available.

At phase −2, the Primary Conflict signal 22 is transmitted to instruction issue circuit 16 indicating that the instruction cannot issue at phase 0 because of a resource conflict with a previously issued instruction. This signal 22 enters instruction issue circuit 16 at phase −1 before instruction issue. As a result, at phase 0 the Issue signal 23 drops.

Note that for circuit 15 to set a reservation flag, it requires an active Issue signal 23. Therefore, if a Primary Conflict 22 is indicated, reservation flags are not set. As discussed herein later in conjunction with FIG. 5, a Primary Conflict 22 will hold instruction issue for the first clock period and a Secondary Conflict will hold instruction issue until the resource is released. When the resource is released, the instruction issues and an active Issue signal 23 allows circuit 15 to set the reservation flags.

Figure 2:
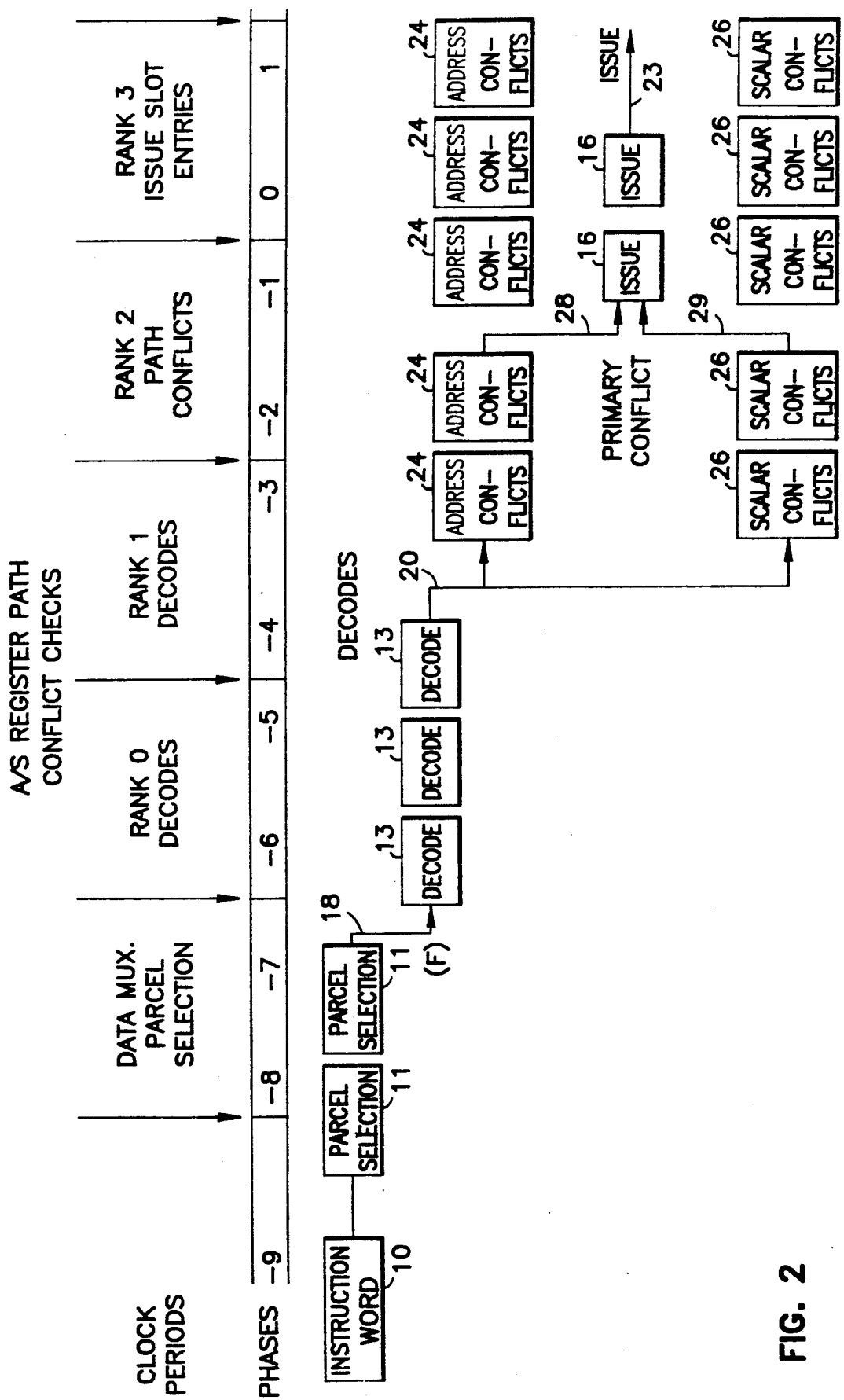
FIG. 2 is a combination hardware-and-timing diagram of the address and scaler register path conflict checks, as executed in the preferred embodiment.

FIG. 2 describes the conflict checks and resource reservations performed for address and scalar registers. More specifically, it checks for path conflicts to address and scalar registers. These are different from vector register conflicts. A vector register conflict as in FIG. 1 would, for example, involve a destination vector register that an instruction cannot use as an operand vector register until the data from a previous operation is stored into the vector register. In contrast, a path conflict involves the use of data paths into the address or scaler registers. For address and scalar registers, the path need only be reserved for one clock period.

The logic for issuing address or scaler instructions is illustrated by the timing diagram of FIG. 2. At phase −9, the instruction word resides in register 10. From phase −8 through phase −7 one of the four instruction parcels is selected by circuit 11 for transmittal to the decode circuit 13. From phase −6 through phase −4, the decode process determines if the instruction is requesting an address register or a scaler register. Beginning at phase −3, the conflict checks for address and scalar registers begin.

Circuit 24 resolves conflicts for the path to the address registers. At phase −3, circuit 24 captures the information 20 transmitted by the decode circuit 13. In turn, circuit 24 transmits a Primary Conflict signal 28 at phase −2 if a conflict arises over the address register path. Once the instruction issues, circuit 24 sets the correct bit in the delay chain associated with the address register path.

Circuit 26 is responsible for scalar register path conflicts. At phase −3, circuit 26 captures the information 20 transmitted by the decode circuit 13. In turn, circuit 26 generates a Primary Conflict signal 29 at phase −2 if a conflict arises over the scalar register path. Once the instruction issues, circuit 26 sets the correct bit in the delay chain associated with the particular path.

Path reservations for address and scalar registers are maintained using shift registers that act as delay chains. Each delay chain shifts by one bit at every clock period to represent a path time interval. Whenever an instruction is issued which uses an address or scaler register, circuits 24 or 26 must insure that the path to the address or scaler register is available when needed. For example, an instruction is issued that transmits a result to a scalar register twelve clock periods after issue. Circuit 26 must account for this interval and reserve the scalar register path twelve clock periods after issue before allowing the instruction to issue. Any succeeding instructions must account for this reservation if they wish to transmit results to the scalar registers. Succeeding instructions must not collide with the result from any previously issued instruction.

Figure 6:
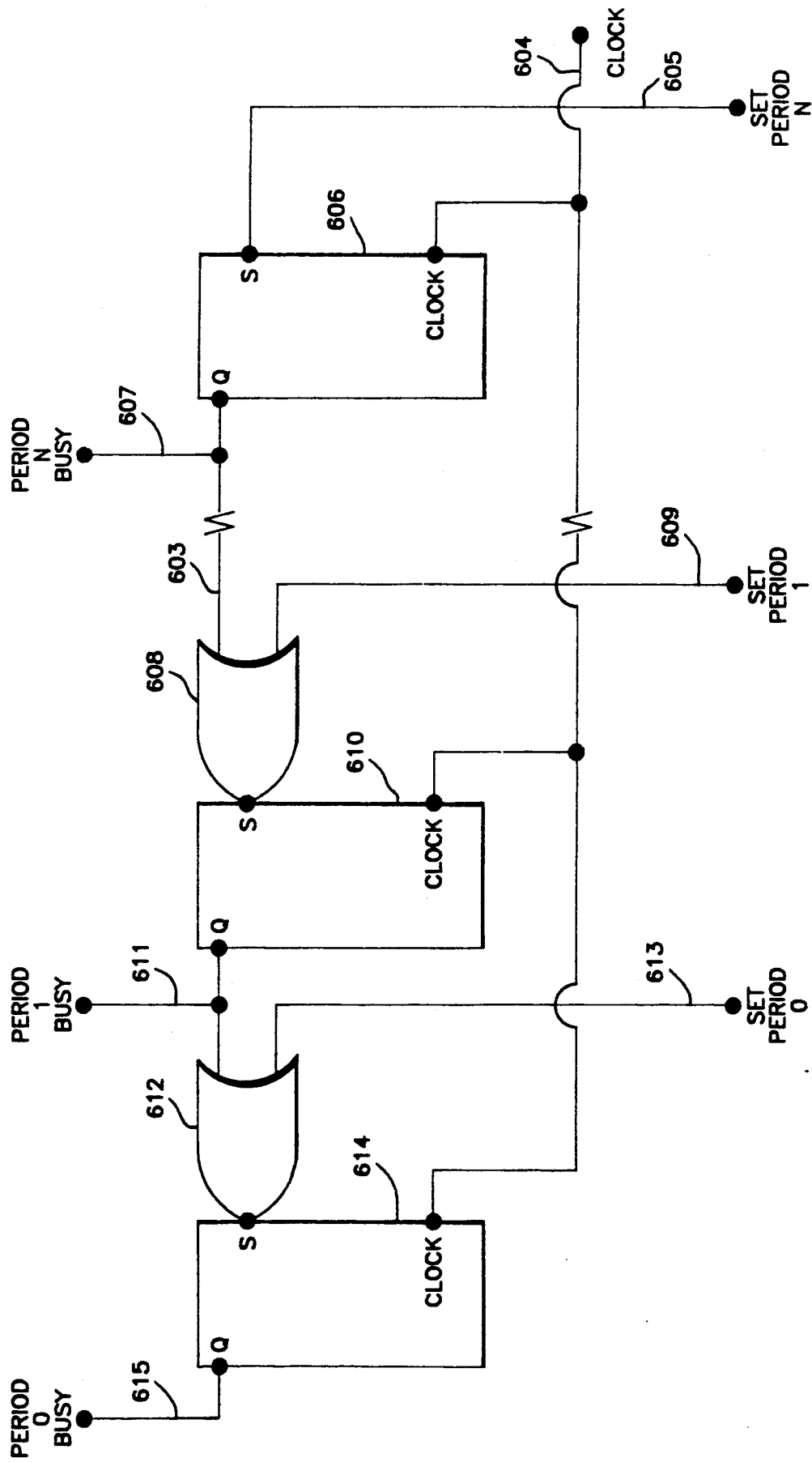
FIG. 6 is a shift register example of the delay chain reservation flags for either the address or scaler register paths.

FIG. 6 describes the shift register used in the preferred embodiment. The address and scaler register paths are each served by one shift register. The number of latches within each shift register corresponds to the longest delay possible between instruction issue and a result being delivered to the address or scaler registers.

In FIG. 6, three latches are shown: latch 614 corresponds to the path reservation for clock period 0 after instruction issue; latch 610 corresponds to the path reservation for clock period 1 after instruction issue; latch 606 corresponds to the path reservation for clock period N after instruction issue. Jagged lines separate latch 610 and latch 606. The jagged lines indicate that some number of latches exist within the shift register between latch 610 and 606. Latch 606 represents the highest delay value possible.

At every clock pulse 604, latch 606 is set by signal 605, also labelled as Set Period N. If signal 605 is a logical "1", latch 606 is set. If signal 605 is a logical "0", latch 606 is cleared. The output from latch 606 is transmitted to the conflict checking circuits, 24 or 26, via signal 607, also labelled as Period N Busy. If output 607 is a logical "1", then the path is reserved at clock period N. If signal 607 is a logical "0", then the path is available at clock period N. At every clock pulse 604, the output 607 from latch 606 is transmitted to the next latch in the shift register. Therefore, the input of each latch at clock time T is shifted to the next latch at clock time T+1.

At every clock pulse 604, latch 610 is set or cleared by the output of OR gate 608, whose input is signal 609, also labelled as Set Period 1, and the output 603 from the previous latch. The output from latch 610 is transmitted to the conflict checking circuits, 24 or 26, via signal 611, also labelled as Period 1 Busy.

At every clock pulse 604, latch 614 is set or cleared by the output of OR gate 612, whose input is signal 613, also labelled as Set Period 0, and the output 611 from the previous latch 610. The output from latch 614 is transmitted to the conflict checking circuits, 24, 26, via signal 615, also labelled as Period 0 Busy.

Every latch in the shift register may be sampled or set at every clock period by the conflict checking circuits 24 or 26. Note that circuits 24 and 26 must offset the shift register output by 1 because the delay chain is examined 1 clock period prior to the instruction issue time.

Figure 3:
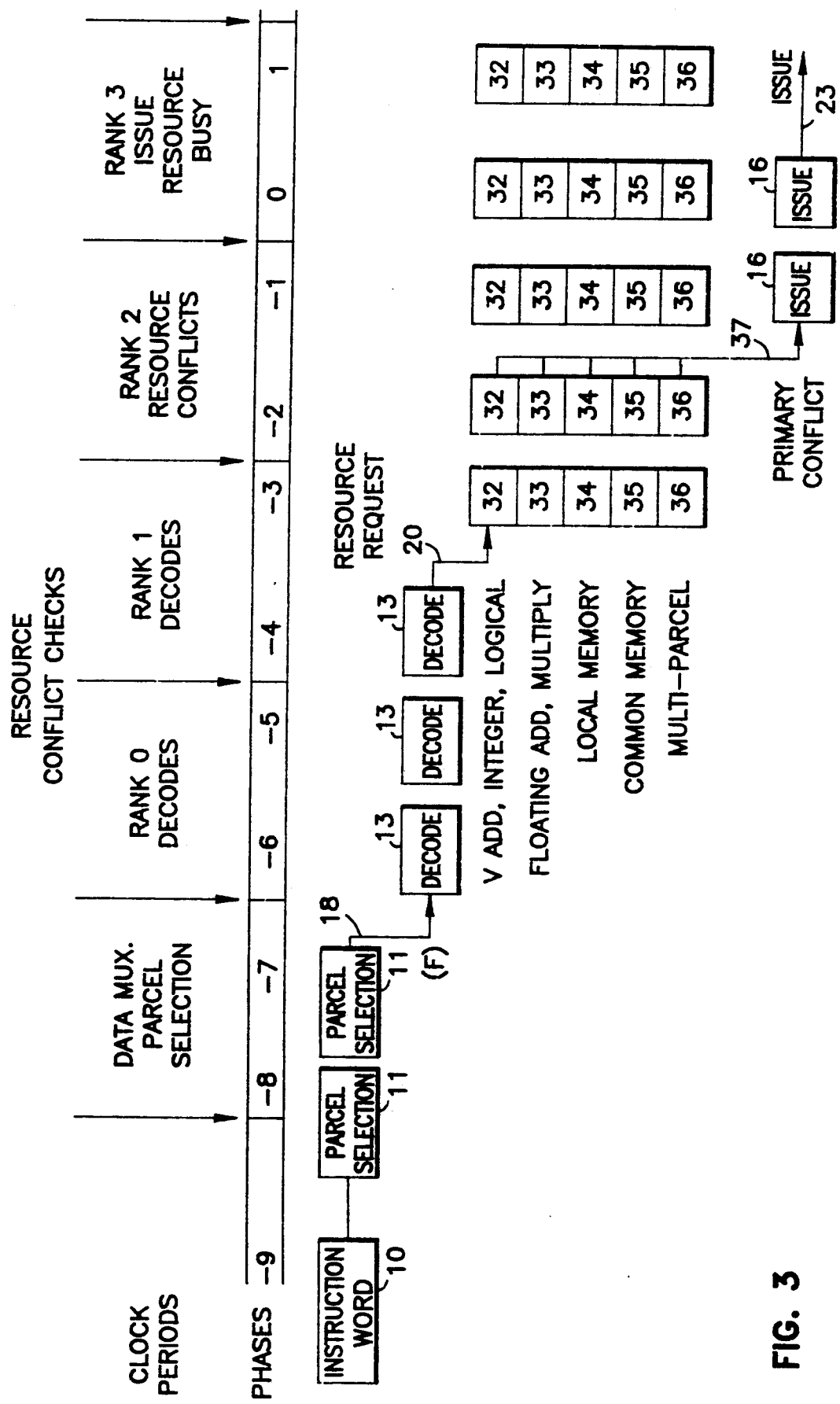
FIG. 3 is a combination hardware-and-timing diagram of the functional unit conflict checks, as executed in the preferred embodiment.

FIG. 3 describes the conflict checks performed for the remaining resources, including vector functional units 32 and 33, local memory access 34, common memory access 35, and multi-parcel instruction 36.

At phase −9, the instruction word is present in register 10. Parcel selection by circuit 11 occurs from phase −8 through phase −7. At phase −6, the instruction 18 enters the decode circuit 13. The decode circuit 13 requires 3 phases to complete. At phase −3, the decode circuit 13 transmits information 20 to the conflict checking circuits 32, 33, 34, 35 and 36. A Primary Conflict signal 37 is generated at phase −2 if a conflict is detected. If no Primary Conflict signal 37 is generated, issue occurs at phase 0. At phase +1 after issue, the resource reservation flags are set by circuits 32, 33, 34, 35 and 36.

Figure 4:
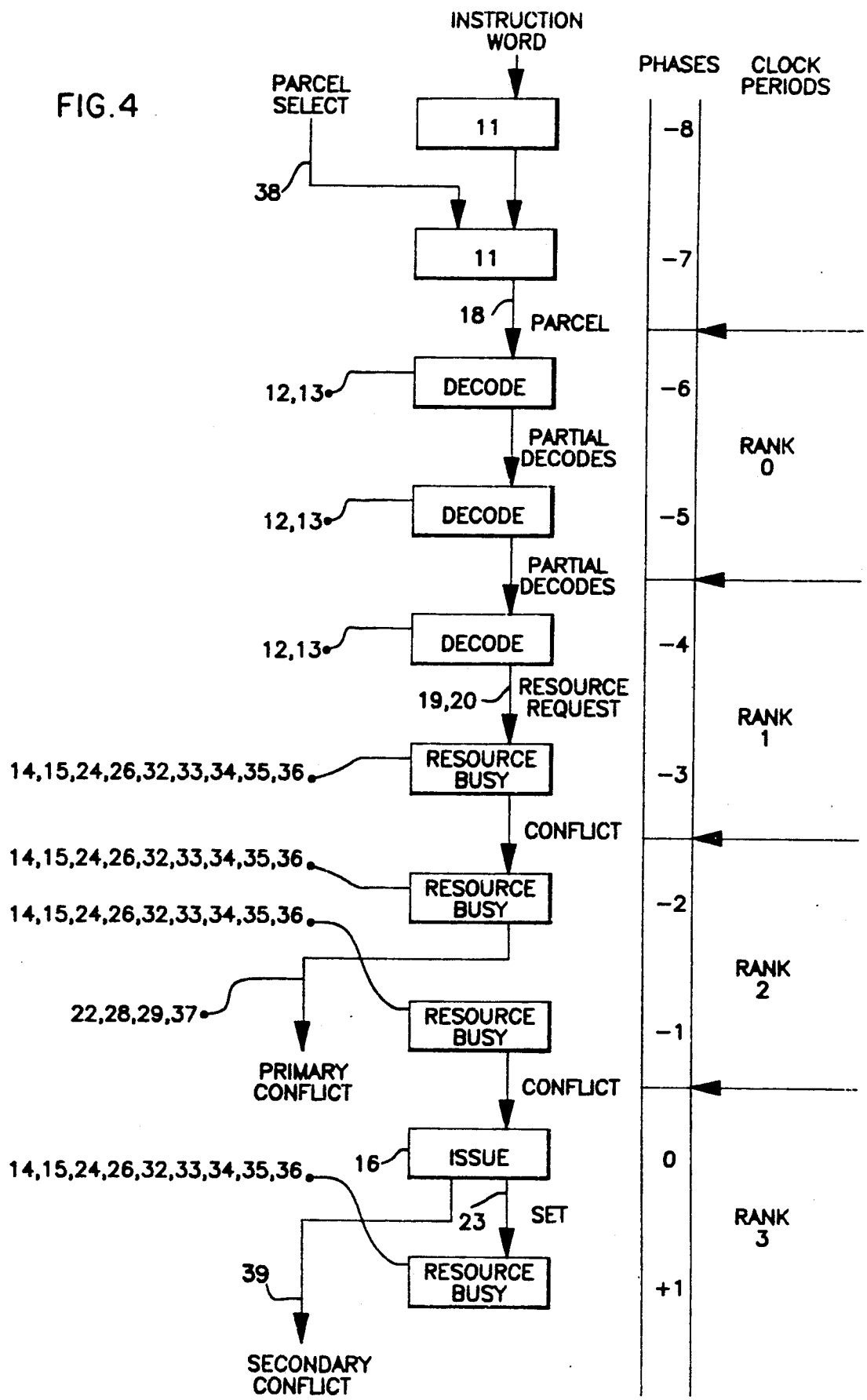
FIG. 4 is a timing diagram describing the sequence for conflict checks, as executed in the preferred embodiment.

FIG. 4 provides a more general description than the first three drawings. At phase −8, the instruction word enters the selection circuit 11. The signal Parcel Select 38 at phase −7 tells the selection circuit 11 which parcel to choose. At phase −7, the instruction parcel 18 is sent to the decode circuits 12 and 13. At phase −6, the decoding process begins. At phase −4, the decoding process is complete and signals 19 and 20 are generated indicating which resources are requested by the instruction. At phase −3, conflict checks 14, 15, 24, 26, 32, 33, 34, 35, or 36 begin, comparing resources that are currently busy or will become busy with the resources being requested. Primary Conflict signals 22, 28, 29, or 37 are generated at phase −2 if a conflict occurs. If a Primary Conflict is signalled, instruction issue does not occur at phase 0 and the signal Issue 23 drops. At phase 0, another signal called Secondary Conflict 39 may be generated. A Secondary Conflict signal 39 means that the resource conflict that caused the Primary Conflict signal 22, 28, 29, or 37 still exists so instruction issue must be held.

Therefore, in look-ahead instruction issue control, a series of checks are made prior to instruction issue that can generate a Primary Conflict signal that causes instruction issue to be held for 1 clock period. If the conflict is not resolved within that 1 clock period, a Secondary Conflict signal is generated for additional clock periods. For every clock period thereafter, until the conflict is resolved, the Secondary Conflict signal prevents instruction issue from occurring. When the conflict is finally resolved, the Secondary Conflict signal drops and the instruction is allowed to issue. At that point, +N phases after instruction issue was first scheduled to occur, the resource reservation flags are set by instruction issue control.

Figure 5:
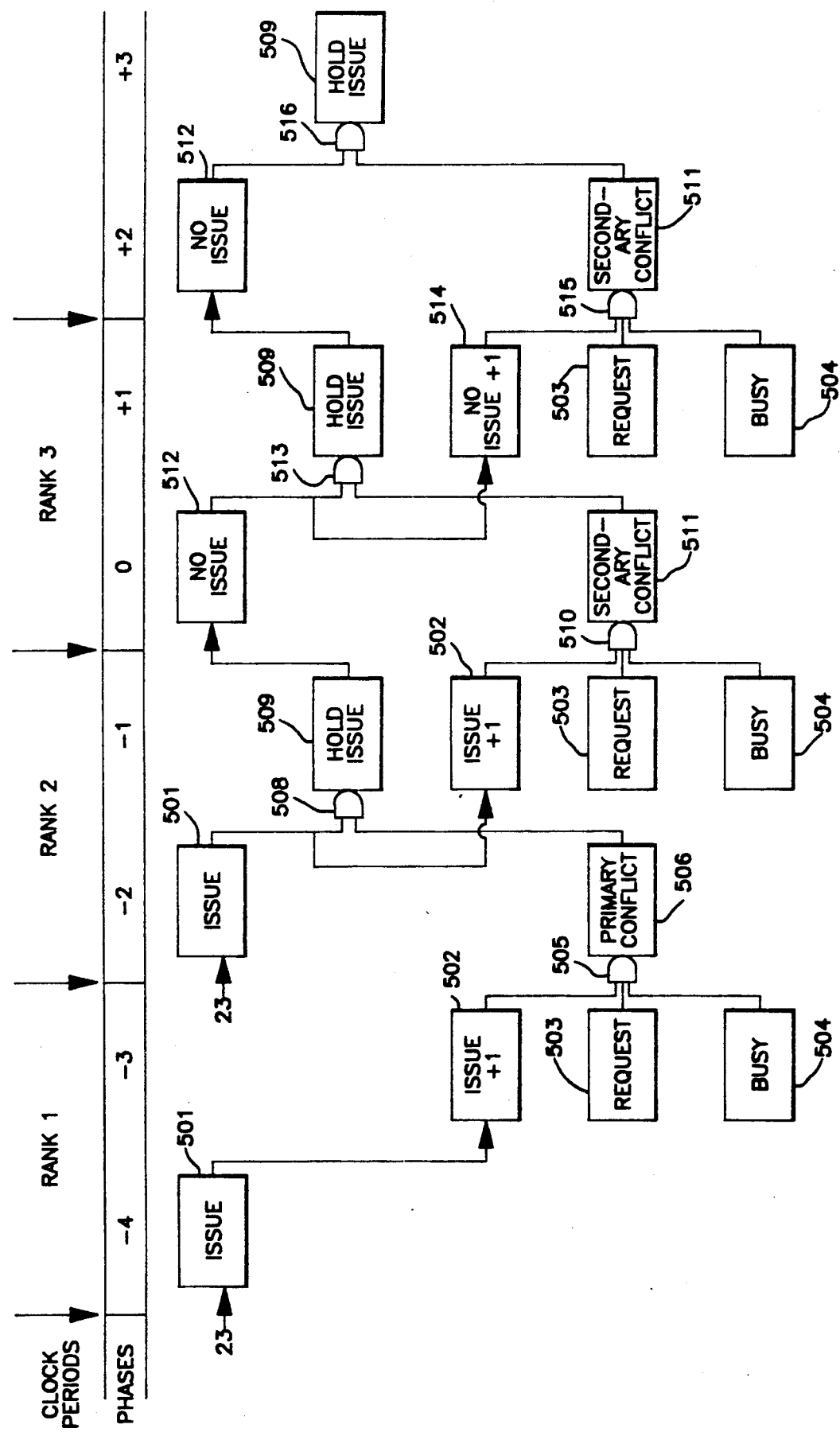
FIG. 5 is a combination hardware-and-timing diagram illustrating a primary and secondary conflict, as executed in the preferred embodiment.

FIG. 5 describes in more detail the logic required for generating Primary and Secondary Conflicts.

At phase −4, issue occurs for an instruction that is two instructions ahead of our example instruction. The latch Issue 501 is set by Issue signal 23 for one clock period as a result of instruction issue. At phase −3, Issue 501 sets latch Issue +1 502 for one clock period. At phase −2, latch Primary Conflict 506 is set for one clock period by AND gate 505, whose input is Issue +1 502, Request 503, and Busy 504.

Request 503 represents the operation of circuits 12 and 13 which output a series of signals that identify the resource requests of the example instruction. Busy 504 represents the operation of circuits 15, 24, 26, 32, 33, 34, 35, and 36 which output a series of signals that identify which resources are currently busy and which resources will become busy when the next instruction issues at phase −2. The AND operation at 505 sets Primary Conflict 506 for one clock period if a conflict occurs between the Request 503 and Busy 504 outputs.

At phase −2, issue occurs for the instruction immediately ahead of the example instruction and Issue 501 is again set by Issue signal 23 for one clock period. At phase −1, latch Hold Issue 509 is set for one clock period by AND gate 508, whose input is Issue 501 and Primary Conflict 506. At phase −1, Issue +1 502 is set for one clock period by Issue 501. At phase 0, latch Secondary Conflict 511 is set for one clock period by AND gate 510, whose input is Issue +1 502, Request 503, and Busy 504. At phase 0, Hold Issue 509 prevents instruction issue for the example instruction by setting latch NO Issue 512 for one clock period. At phase +1, latch No Issue +1 514 is set for one clock period by No Issue 512. At phase +1, Hold Issue 509 is set for one clock period by AND gate 513, whose input is No Issue 512 and Secondary Conflict 511. At phase +2, Hold Issue 509 again prevents instruction issue by setting No Issue 512 for one clock period.

Notice that a Secondary Conflict can hold issue on an instruction only if a Primary Conflict has occurred. The Primary Conflict prevents instruction issue at phase 0 only. Thereafter, as long as a conflict remains between Request 503 and Busy 504, Secondary Conflict 511 prevents instruction issue. Once the conflict is resolved, Secondary Conflict 511 clears. As a result, Hold Issue 509 and No Issue 512 clear and instruction issue occurs.

The Primary Conflict actually indicates the "look-ahead" conflict. In contrast, the Secondary Conflict prevents an instruction at the issue position from issuing until all the requested resources are available. When an instruction is at the issue position in a prior art machine, it is held until the resource conflicts are resolved. A Primary Conflict on the other hand, indicates that the resources are already busy or will become busy before the instruction issues.

Although a specific configuration circuitry has been illustrated and described for the preferred embodiment of the present invention set forth herein, it will be appreciated by those of ordinary skill in the art that any arrangement of circuitry which is calculated to achieve the same purpose may be substituted for the specific circuitry shown. Thus, the present invention disclosed herein may be implemented through the use of different components or in different timing arrangements then those disclosed in the detailed description. This application is intended to cover any adaptations or variations of the present invention. Therefore, it is manifestly intended that this invention be limited only by the claims and the equivalents thereof.

What is claimed is:

1. A system for issuing instructions in a vector register computer, comprising:
   select means for receiving an instruction word prior to when the instruction word is scheduled to issue and for selecting an instruction parcel from the instruction word, the instruction parcel representing an operation to be performed;
   decode means for decoding resources requested by the instruction parcel, the decode means comprising:
   a) vector register decode means for decoding vector registers requested by the instruction parcel and for generating therefrom a first decode signal representative of the vector register request;

b) functional unit decode means for decoding functional units requested by the instruction parcel and for generating therefrom a second decode signal representative of the functional unit request; and c) address and scalar register decode means for decoding address and scalar registers requested by the instruction parcel and for generating therefrom a third decode signal representative of the address register request and a fourth decode signal representative of the scalar register request;

first conflict identification means for receiving the first, second, third, and fourth signals from the decode means, for identifying conflicts at least one clock period prior to issuance, and for generating signals to set reservation flags, the first conflict identification means comprising:

a) first vector register conflict means for checking, in response to the first decode signal, vector register reservation flags, for generating therefrom a first primary conflict signal if the requested vector registers will be busy when the instruction issues, and for setting therefrom the vector register reservation flags if the requested vector registers will be available when the instruction issues;

b) first functional unit conflict means for checking, in response to the second decode signal, functional unit reservation flags, for generating therefrom a second primary conflict signal if the requested functional units will be busy when the instruction issues, and for setting therefrom the functional unit reservation flags if the requested functional units will be available when the instruction issues; and c) first address and scalar register conflict means for checking, in response to the third and fourth signals, address and scalar register reservation flags, for generating therefrom a third primary conflict signal if the requested address and scalar registers will be busy when the instruction issues, and for setting therefrom the scalar and address reservation flags if the requested scalar and address registers will be available when the instruction issues;

second conflict identification means for identifying conflicts in response to the first, second, and third primary conflict signals, for holding the instruction until the requested resources are available, and for generating signals to set the reservation flags, the second conflict identification means comprising:

a) second vector register conflict means for checking, in response to the first primary conflict signal, the vector register reservation flags when the instruction word is scheduled to issue, for generating therefrom a first secondary conflict signal for as long as the requested vector registers remain busy, and for setting therefrom the vector register reservation flags when the requested vector registers are available;

b) second functional unit conflict means for checking, in response to the second primary conflict signal, the functional unit reservation flags when the instruction word is scheduled to issue, for generating therefrom a second secondary conflict signal for as long as the requested functional units remain busy, and for setting therefrom the functional unit reservation flags when the requested functional units are available; and c) second address and scalar register conflict means for checking, in response to the third primary conflict signal, the address and scalar register reservation flags when the instruction word is scheduled to issue, for generating therefrom a third secondary conflict signal for as long as the requested address and scalar registers remain busy, and for setting therefrom the address and scalar register reservation flags when the requested scalar and address registers are available.

2. The system of claim 1 wherein the vector register reservation flags comprise a plurality of latches corresponding one each to the vector registers, the plurality of latches each having a first output state indicating that the corresponding vector register is busy and a second output state indicating that the corresponding vector register is available.

3. The system of claim 1 wherein the functional unit reservation flags comprise a plurality of latches corresponding one each to the functional units, the plurality of latches each having a first output state indicating that the corresponding functional unit is busy and a second output state indicating that the corresponding functional unit register is available.

4. The system of claim 1 wherein the address and scalar register reservation flags comprises a plurality of shift register delay chains corresponding one each to the address and scalar registers, the plurality of shift register delay chains each having a plurality of bits which shift one position for each clock period of the computer, each of the plurality of bits corresponding a clock period and having a first state indicating that the corresponding register is busy during the corresponding clock period and having a second state indicating that the corresponding register is available during the corresponding clock period.

5. The system of claim 1 wherein:

the functional unit decode means comprises means for decoding local and common memory accesses requested by the instruction parcel and for generating a fifth signal representative of the lock and common memory access request;

the first functional unit conflict means comprises means for checking, in response to said fifth signal, common and local memory access reservation flags for generating therefrom the second primary conflict signal if the requested local and common memory accesses will be busy when the instruction issues, and for setting therefrom the common and local memory access flags if the requested common and local memory accesses will be available when the instruction issues;

the second functional unit conflict means comprises means for checking, in response to the second primary conflict signal, the common and local memory access reservation flags when the instruction word is scheduled to issue, for generating therefrom the second secondary conflict signal for as long as the common and local memory accesses remain busy, and for setting therefrom the common and local memory access reservation flags when the requested common and local memory accesses are available.

6. The system of claim 1 wherein the instruction word is 64 bits long and the instruction parcel is 16 bits long.

* * * * *

UNITED STATES PATENT AND TRADEMARK OFFICE
CERTIFICATE OF CORRECTION

PATENT NO. : 5,127,093

DATED : June 30, 1992

INVENTOR(S) : William T. Moore

Page 1 of 2

It is certified that error appears in the above-identified patent and that said Letters Patent is hereby corrected as shown below:

In column 2, line 9, delete "scaler" and insert --scaler-- therefor.

In column 2, line 21, delete "scaler" and insert --scaler-- therefor.

In column 3, line 42, delete "scaler" and insert --scaler-- therefor.

In column 3, line 49, delete "scaler" and insert --scaler-- therefor.

In column 3, line 51, delete "scaler" and insert --scaler-- therefor.

In column 3, line 58, delete "scaler" and insert --scaler-- therefor.

In column 4, line 12, delete "scaler" and insert --scaler-- therefor.

In column 4, line 14, delete "scaler" and insert --scaler-- therefor.

UNITED STATES PATENT AND TRADEMARK OFFICE
CERTIFICATE OF CORRECTION

PATENT NO. : 5,127,093
DATED : June 30, 1992
INVENTOR(S) : William T. Moore

It is certified that error appears in the above-identified patent and that said Letters Patent is hereby corrected as shown below:

In column 4, line 25, delete "scaler" and insert --scaler-- therefor.

In column 4, line 29, delete "scaler" and insert --scaler-- therefor.

In column 5, line 6, delete "instruction" and insert --instructions-- therefor.

In column 8, claim 5, line 42, delete "lock" and insert --local-- therefor.

Signed and Sealed this

Tenth Day of August, 1993

Attest:

MICHAEL K. KIRK

Attesting Officer        Acting Commissioner of Patents and Trademarks